Feb. 7, 1950     M. R. ORTMEIER     2,496,305
SELF-UNLOADING TRAILER
Filed June 15, 1946
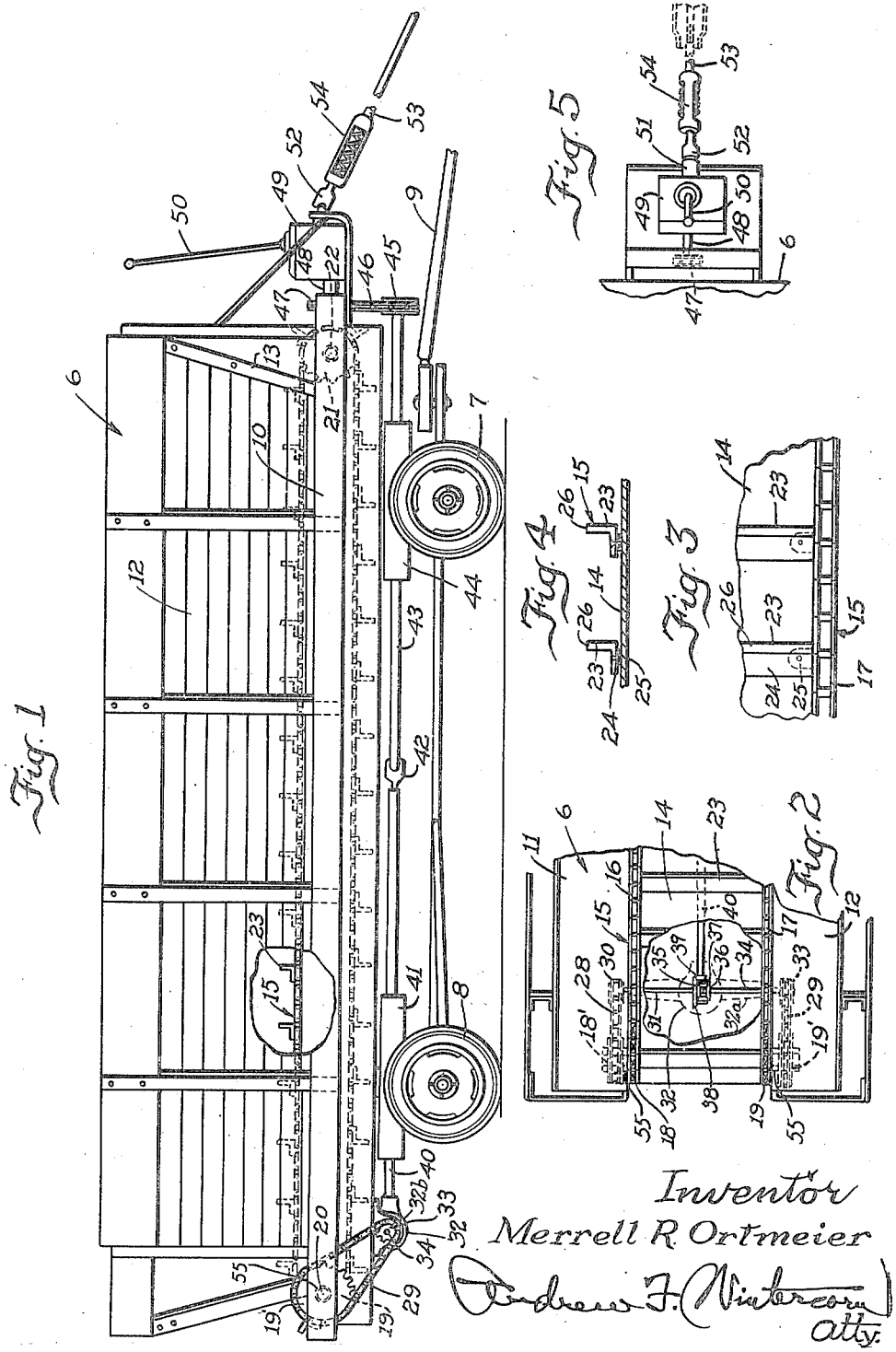
Inventor
Merrell R Ortmeier Patented Feb. 7, 1950

2,496,305

UNITED STATES PATENT OFFICE 2,496,305

SELF-UNLOADING TRAILER

Merrell R. Ortmeier, Freeport, Ill.

Application June 15, 1946, Serial No. 676,963

2 Claims. (Cl. 214—83.36)

This invention relates to a self-unloading trailer for use on farms for various purposes, as, for example:

(1) Tractor unloading, in which the trailer unloads as the tractor drives along, as in unloading corn cobs and hog feed;

(2) In unloading corn and oats to an elevator, in filling a crib;

(3) In cut hay and silo filling, in which the unloader unloads to a blower, which throws the material into the silo;

(4) In corn husking and oat harvesting, where the unloader is pulled behind the corn picker to catch the ears for later unloading into an elevator;

(5) In spreading cinders, gravel, and the like, or spreading top dressing on lawns and other places;

(6) The unloader, when the endless conveyor is driven in the reverse direction, serves to facilitate loading of various materials, and (7) For general utility around farms and other places.

The principal objects of my invention are:

(a) To provide a vehicle of the kind mentioned, having an endless conveyor bottom, the two sides of which are formed by endless chains running over sprockets at opposite ends of the vehicle, the sprockets at one end being driven by separate shafts that are interconnected through a differential to which the drive is transmitted, thus giving uniform drive to both sides of the conveyor;

(b) To provide a vehicle of the kind mentioned, in which the endless conveyor is formed by transverse angle iron slats, each of which has one flange connected at its opposite ends to laterally projecting ears on links of the endless chains forming the sides of the conveyor, the other flange projecting upwardly at right angles to the bottom of the vehicle along which the slats move, whereby to push the material along the bottom and crowd it toward one end of the vehicle body, and (c) To provide a vehicle of the kind mentioned, having a change speed transmission box mounted on one end thereof, with an input shaft extending forwardly therefrom for detachable coupling universal joint connection with the tractor used to draw the trailer, and having an output shaft extending rearwardly therefrom and connected by means of a chain and sprockets with propeller shafts disposed below the trailer body and extending from the front end to the rear end for connection with the aforesaid differential that is provided on the rear end of the trailer.

The invention is illustrated in the accompanying drawing, in which—

Fig. 1 is a side view of a self-unloading trailer made in accordance with my invention;

Fig. 2 is a plan view of the rear portion of the trailer, with a portion of the bottom broken away to disclose the differential drive for the endless conveyor;

Figs. 3 and 4 are enlarged fragmentary details of the conveyor, and

Fig. 5 is a plan view of the front end of the trailer, showing the gear box and its input and output shafts.

The same reference numerals are applied to corresponding parts throughout the views.

The reference numeral 6 designates the body of the trailer generally, which is mounted on front and rear pairs of wheels 7 and 8, the front wheels being used for steering and having the tongue 9, that is attached to the tractor, extending forwardly therefrom. The bottom frame 10 of the trailer body supports inclined hopper sides 11 and 12 and a front end 13. A bottom 14, which may be formed by a heavy piece of sheet metal extending from side to side and front to rear of the body, has an endless conveyor 15 cooperating therewith, to facilitate loading and unloading. This conveyor comprises endless chains 16 and 17 disposed on opposite sides of the bottom and driven by a pair of sprockets 18—19 that are mounted by means of sleeves 55 on opposite ends of a cross-shaft 20 suitably supported in the rear end of the bottom frame 10, the sleeves 55 carrying other sprockets 18' and 19' that are used for drive purposes, as will soon appear. Idler sprockets 21 mounted on a cross-shaft 22 in the front end of the bottom frame 10 cooperate with the chains 16 and 17 at the front end of the bottom 14. At spaced intervals along the chains 16 and 17 there are transverse slats 23 formed by pieces of angle iron. Each of these slats has its one flange 24 riveted, or otherwise suitably secured, at its opposite ends to laterally projecting ears 25 provided on links of the chains 16—17, so that the angle iron slats will slide along the bottom 14 in fairly close contact, and so that their other flanges 26, which project upwardly from the bottom 14 substantially at right angles, will serve to push along the material that happens to be in front of these flanges, thus crowding the material toward one or the other end of the body of the trailer, depending upon the direction of drive on the conveyor 15. It is apparent, therefore, that I have provided an endless conveyor of extremely simple and practical as well as durable construction, and one which may be made economically.

The sprockets 18 and 19 have independent chain drives, as indicated at 28 and 29 in Fig. 2, the chain 28 cooperating with the sprocket 18' and extending over a sprocket 30 on the outer end of an axle shaft section 31 that extends from one side of the differential housing 32, and the chain 29 cooperating with the other sprocket 19' on the other side of the vehicle and extending over another sprocket 33 on the outer end of another axle shaft section 34 that extends from the other side of the differential housing 32. The housing 32 has its opposite end portions 32a suitably supported on the frame 10, as on brackets 32b, and the shafts 31 and 34 extend from these end portions. The shafts 31 and 34 have the usual differential gear connections in the housing 32, as indicated at 35—37, 38 being the ring gear of the differential which meshes with the pinion 39 on the rear end of the propeller shaft 40. With this differential drive, it is clear that I obtain uniform drive to the two chains 16 and 17 of the conveyor 15, and that is, of course, very important for the successful operation of this trailer. The propeller shaft 40 extends through a suitable bearing 41 on the rear end of the trailer, and has a universal joint connection at a mid-point of the trailer, as indicated at 42, with the rear end of another propeller shaft 43 that is mounted in a bearing 44 on the front end of the trailer. A sprocket 45 is provided on the front end of the propeller shaft 43, and has a chain 46 extending over it for connection with another sprocket 47 on the output shaft 48 of the change speed gear box 49, through which three speeds forward and one speed in reverse may be obtained by manipulation of the control lever 50. The input shaft 51 of the gear box is adapted to be connected detachably with a power take-off shaft on the tractor, in any suitable or preferred manner, as, for example, through a universal joint 52 and intermediate shaft 53, including a splined portion 54, which will compensate for changes in elevation of the tractor in relation to the trailer as they move along over more or less rough ground. It will, therefore, be clear that the drive means I have employed is of a type which permits use of a standard automotive change speed gear box at proportionately lower cost, and also propeller shafts and a differential of a kind commonly used for automotive purposes for a further appreciable saving in cost.

It is believed the foregoing description conveys a good understanding of the objects and advantages of my invention. The appended claims have been drawn to cover all legitimate modifications and adaptations.

I claim:
1. A vehicle of the character described comprising in combination, a frame, a body mounted on the frame consisting of a bottom, opposed side walls and a front end wall, an endless conveyor mounted in the body associated with the bottom thereof, said conveyor comprising a pair of endless chains working lengthwise on opposite sides of said bottom with their upper flights disposed at the approximate level of and closely adjacent the side edges of said bottom, crossmembers secured at their ends to said chains and slidable lengthwise of said bottom to move material therealong, sprockets mounted on opposite ends of said frame over which said chains are extended for guide and drive purposes, ground wheels supporting said frame, a differential carried on said frame including two coaxial shafts, and a ring gear drivingly connected to said shafts through differential gears, means drivingly connecting said shafts to two of the aforesaid sprockets on one end of said frame to transmit drive uniformly to said chains, power operable means drivingly connected to the ring gear of said differential to transmit drive thereto, and a change speed gear box mounted on said frame having a manually shiftable lever for selection of different speeds and direction of drive, said gear box including an input shaft having means whereby the same may be driven from a power source, and an output shaft operatively connected with the power operable means that is drivingly connected to the ring gear of said differential.

2. A vehicle of the character described comprising in combination, a frame, a body mounted on the frame consisting of a bottom, opposed side walls and a front end wall, an endless conveyor mounted in the body associated with the bottom thereof, said conveyor comprising a pair of endless chains working lengthwise on opposite sides of said bottom with their upper flights disposed at the approximate level of and closely adjacent the side edges of said bottom, crossmembers secured at their ends to said chains and slidable lengthwise of said bottom to move material therealong, sprockets mounted on opposite ends of said frame over which said chains are extended for guide and drive purposes, ground wheels supporting said frame, and means for transmitting drive uniformly to said chains in either direction and at variable speeds comprising a change speed gear box mounted on the front end of said frame having a manually shiftable lever for selecting different speeds and the direction of drive, an input shaft for said gear box having means whereby the same may be driven from a power source, and an output shaft, a differential housing supported on the rear end of said frame containing differential gearing driven by a ring gear and coaxially disposed shafts drivingly connected to the differential gearing, a pinion driving the ring gear, shaft means extending forwardly from the pinion to and drivingly connected with the aforesaid output shaft of said gear box, and sprockets on the outer ends of said coaxially disposed shafts drivingly connected through chains and other sprockets to two of the aforesaid sprockets at the rear end of said frame.

MERRELL R. ORTMEIER.

REFERENCES CITED

The following references are of record in the file of this patent:

UNITED STATES PATENTS

| Number | Name | Date |
|---|---|---|
| 1,135,073 | Swarner | Apr. 13, 1915 |
| 1,714,306 | George | May 21, 1929 |
| 1,945,532 | Lima | Feb. 6, 1934 |
| 1,979,945 | Kranick | Nov. 6, 1934 |
| 2,321,168 | Tognetti | June 8, 1943 |
| 2,420,009 | Osgood | May 6, 1947 |
| 2,431,000 | Step | Nov. 18, 1947 |
| 2,434,718 | Recker | Jan. 20, 1948 |